Patented June 17, 1941

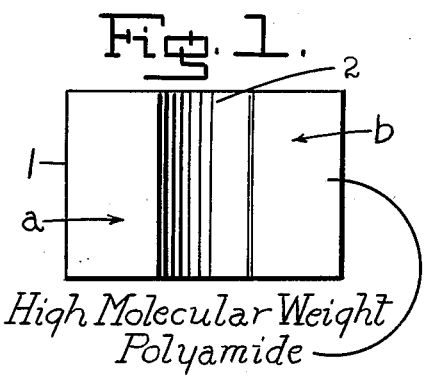
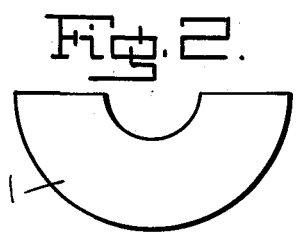
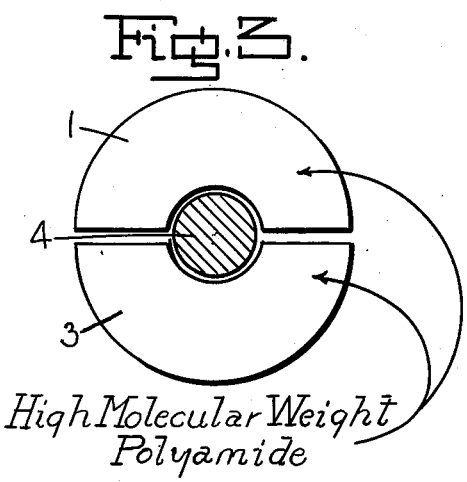

2,246,086

UNITED STATES PATENT OFFICE 2,246,086
BEARING

Paul R. Austin, Wilmington, Del., assignor to E. I. du Pont de Nemours & Company, Wilmington, Del., a corporation of Delaware Application January 8, 1940, Serial No. 312,965

4 Claims. (Cl. 308—238)

This invention relates to machine bearings and more particularly to improved synthetic bearings.

It has been customary for some time to prepare bearings and bearing surfaces from metals selected for their low frictional resistance and long wearing qualities. These have been reasonably satisfactory except that the metals, such as Babbitt metal, having the best frictional properties, are so soft that they have a rather poor load-bearing capacity, and the metals which are harder and can carry heavier loads have poorer frictional properties and may wear or score excessively those moving parts with which they are in contact. Also, metal bearings usually require oil or some other lubricant which may soil or contaminate articles which are being manufactured.

This situation has been somewhat improved by the introduction of resin bearings. These bearings are usually made from a heat-hardened phenol-formaldehyde resin containing approximately 50% by weight of a reinforcing agent such as fabric or fiber. Such bearings have the advantages that they can be operated with water lubrication, thus reducing the likelihood of spoilage or contamination, and that they have very high load-carrying capacities when so lubricated. Resin bearings, however, possess the disadvantages that they do not always operate well with oil lubrication when this is desired and they must be made with some reinforcing agent, thus complicating their manufacture and making it more expensive. Furthermore, these bearings and many metal bearings are adversely affected by alkalies.

This invention has as an object new and improved synthetic bearings and bearing surfaces. Further objects are bearings and bearing surfaces which have reduced frictional resistance, are non-corrosive and non-corrodible and which provide heat, sound, vibration, and electrical insulation between various parts of the mechanism embodying the bearing. A still further object is the production from synthetic materials of bearings or bearing surfaces which do not require reinforcing, such as fabric, fiber, or filler. Other objects will appear hereinafter.

These objects are accomplished by the formation of bearings and bearing surfaces from high molecular weight polyamides.

I have found that bearings formed from high molecular weight polyamides, and particularly from the fiber-forming synthetic linear polyamides combine better frictional properties with higher load-carrying capacities than is possible with metals, and that unlike most synthetic bearings heretofore proposed they are capable of operating without fiber reinforcement in either oil or water lubricant or even without lubricant and are not adversely affected by alkalies in moderate concentrations.

In the accompanying drawing, Fig. 1 is a plan view of one-half of a complete bearing, Fig. 2 is an end view of the bearing part shown in Fig. 1, and Fig. 3 is an end view showing the assembly of the complete bearing and rotating shaft.

The bearing housing indicated by the numerals 1 and 3 and provided with a bearing surface 2 as shown in the accompanying drawing were machined from a cast rod of polyhexamethylene adipamide. A small amount of material was removed from the faces $a$ and $b$ of the 180° arc bearings obtained so that when two such bearings were placed together on the round shaft 4 of one-fourth inch in diameter which extends from the test machine the two halves of the bearing came into firm contact with the shaft, but did not come into contact with each other.

The polyamides used in the practice of this invention are obtained from polyamide-forming reactants, as for instance by self polymerization of aminocarboxylic acids or by heating a polyamine with a polycarboxylic acid under polymerizing conditions until a high molecular weight polyamide is obtained. Particularly useful for the present purpose are the linear or fiber-forming polyamides or superpolyamides disclosed in U. S. Patents 2,071,253 and 2,130,948. These polyamides, which are usually definitely crystalline rather than resinous, are obtainable from bifunctional reactants, as for instance from diamines and dicarboxylic acids or by the self polymerization of monoaminomonocarboxylic acids or their amide-forming derivatives, e. g. the lactams and from the reactants referred to later, the reaction being continued until the polyamide has a viscosity of at least 200 poises at 285° C. or has an intrinsic viscosity of 0.6 as defined in U. S. Patent 2,130,948. These polymers as defined herein include the linear fiber-forming polyamides which contain recurring amide groups as an integral part of the main chain of atoms in the molecule and which are obtained by including with the polyamide-forming reactants other bifunctional reactants, such as glycols in which case ester-amide interpolymers are obtained.

The microcrystalline nature of the fiber-forming polyamides is evidenced by their sharp melting points and by the type of diffraction pattern which they furnish on X-ray examination. The term "fiber-forming" refers to the property of these polymers of yielding filaments, as by extrusion of the molten polymer, which upon cold drawing are formed into fibers which show by characteristic X-ray diffraction patterns orientation along the fiber axis. Upon hydrolysis with mineral acids the polyamides yield monomeric amide-forming reactants. For example, a polyamide derived from a diamine and a dibasic carboxylic acid yields on hydrolysis with hydrochloric acid the dibasic carboxylic acid and the diamine hydrochloride. Similarly a polyamide derived from an amino acid yields the amino acid hydrochloride on hydrolysis with hydrochloric acid.

Comparative tests of the new bearings described herein with commonly used metal bearings show better wear resistance, greater load-bearing capacity, greater resilience, and less abrasive action on the shaft for polyamide bearings than for high tin Babbitt bearings. The polyamide bearings are also shown to be superior to Tobin bronze in frictional properties and resistance to wear as well as in low abrasive action on the shaft, and are superior to phosphor bronze in frictional properties and low abrasive action on the shaft. These tests also show that the polyamide bearings will operate successfully under conditions of lubrication that cannot be used with metal bearings. The polyamide bearings show marked advantages over the artificial or composition bearings now in use as shown by the fact that a fabric reinforced phenol-formaldehyde resin bearing failed immediately by charring under conditions in which the polyamide bearing exhibits lower frictional resistance than Tobin bronze or phosphor bronze.

The polyamides described in the above mentioned patents are in general useful for the formation of the bearings disclosed herein. Polyamides particularly suitable for the present purpose include polyhexamethylene adipamide, polyhexamethylene sebacamide, polyepsilonaminocaproamide, polytetramethylene adipamide, polyhexamethylene terephthalamide, and mixtures of these polyamides. Particularly valuable are the synthetic linear polyamides melting above 100° C. It is sometimes advantageous to use polyamides prepared from compounds at least one of which has more than two functional groups so that cross linking of the chains occurs.

The polyamides used in making the improved bearings described herein may be mixed with a large variety of modifying agents such as resins, and with fillers, reinforcing agents, etc. For example, a solid lubricant such as graphite, powdered mica, or asbestos may be incorporated to reduce frictional forces. Liquid lubricants such as plasticizers for polyamides may be incorporated for the same purpose. High boiling esters of carboxylic acids, high boiling sulfonamides, and phenols may be mentioned as among the materials suitable for use in this way. Metal powder or wire may be included to increase heat conductivity through the bearing. Fibers, fabrics, threads, or meshes may be incorporated in the polyamide as reinforcing agents if desired although they are not usually considered necessary. The bearings should contain at least 10% polyamide.

Bearings prepared from synthetic linear polyamides are practically white so that such bearings may be readily colored to improve their appearance, for the purposes of identification, or for other reasons. This coloring may be accomplished by the use of either pigments or dyes.

Bearings prepared from polyamides or from synthetic linear polyamide compositions as described herein may be used not only for mechanical bearing installations where a rotating shaft is supported in a cylindrical bearing, but also in any instance where it is desired to reduce the friction between two relatively moving surfaces. A valuable application of my invention is that in which the polyamide in the form of a plate supports a moving machine part. Other uses are for thrust bearings, roller and ball bearings, non-cylindrical bearings for sliding members, bearing plates supporting a member in oscillating motion, cams, gears, and bearings for outdoor exposure or exposure to other corrosive conditions.

The machine applications in which the present invention is particularly valuable include textile machinery, food handling machinery, household motors, such as found in electric vacuum cleaners, refrigerators, and other mechanisms which are subject to infrequent or no lubrication. The present bearings are also especially advantageous in connection with mechanisms, such as pulleys and the like which are subjected to outdoor exposure and are therefore particularly subject to corrosion.

As has been mentioned the polyamide bearings of this invention provide lower frictional forces than brass or bronze bearings and better wearing qualities than brass or babbitt. Such bearings have a higher load-bearing capacity than babbitt. These bearings have the further advantage that they may be lubricated with water instead of oil. This fact is particularly important in such industries as the food, paper making, and textile industries where oil contamination would result in product spoilage. Bearings prepared from synthetic linear polyamides weigh considerably less than do metal bearings of the same size. Under no circumstances will these bearings score a shaft or other moving part with which they are in contact. They have the advantage over resin bearings that they do not need the incorporation of reinforcing agents in order to keep their dimensions, and they are light colored and can be converted to practically any other color if desired. Most synthetic linear polyamides melt only at temperatures above the operating temperatures of resin bearings. Because of the low frictional properties of synthetic linear polyamides, these bearings can be used in the presence of solvents which remove lubricants. Because synthetic linear polyamides are non-conductors of electricity, bearings of these materials may be used where it is desired to prevent the flow of electrical current or charges between two members moving with respect to each other. Synthetic linear polyamide bearings can be used in the presence of alkaline solutions because polyamides are not readily attacked by such solutions. Bearings prepared from synthetic linear polyamides also provide insulation against vibration, sound, or heat. Because of the non-corrodible nature of synthetic linear polyamides, bearings prepared from these materials do not rust or corrode and thereby alter the clearance between parts of the mechanism.

As many apparently widely different embodiments of this invention may be made without departing from the spirit and scope thereof, it is to be understood that I do not limit myself to the specific embodiments thereof except as defined in the appended claims.

I claim:

1. A machine bearing provided with a bearing surface which comprises a high molecular weight polyamide, and which is capable of operation with and without a lubricant, and which is characterized by low abrasive action against moving parts, said polyamide being derived from polyamide-forming material of the class consisting of aminocarboxylic acids and mixtures of polyamines with polycarboxylic acids.

2. The machine bearing set forth in claim 1 in which said polyamide is a linear polyamide of crystalline structure and is derived from monoaminomonocarboxylic acid.

3. The machine bearing set forth in claim 1 in which said polyamide is a linear polyamide of crystalline structure and is derived from a mixture of diamine and dicarboxylic acid.

4. The bearing set forth in claim 1 in which said polyamide is polyhexamethylene adipamide.

PAUL R. AUSTIN.